United States Patent [19]

Hara

[11] 4,040,255
[45] Aug. 9, 1977

[54] CONTROL SYSTEM FOR A HYDRAULICALLY ACTUATED DEVICE SUCH AS THE VIBRATOR MOTOR OF A SELF-PROPELLED VIBRATORY COMPACTOR

[75] Inventor: Hideo Hara, Kawasaki, Japan

[73] Assignee: Kabushiki Kaisha Komatsu Seisakusho, Tokyo, Japan

[21] Appl. No.: 709,643

[22] Filed: July 29, 1976

[30] Foreign Application Priority Data

July 29, 1975  Japan ............................ 50-104123[U]

[51] Int. Cl.² ........................................... F16H 39/46
[52] U.S. Cl. ...................................... 60/445; 60/448; 60/462
[58] Field of Search ................. 60/375, 379, 381, 382, 60/383, 421, 445, 447, 448, 462, 463, ; 404/103, 122

[56] References Cited

U.S. PATENT DOCUMENTS

| | | | |
|---|---|---|---|
| 2,443,345 | 6/1948 | Ernst | 60/382 X |
| 2,466,604 | 4/1949 | MacMillin et al. | 60/381 X |
| 3,214,911 | 11/1965 | Kempson | 60/462 X |
| 3,932,993 | 1/1976 | Riedhammer | 60/447 X |
| 3,986,358 | 10/1976 | Hoffmann | 60/447 X |

Primary Examiner—Edgar W. Geoghegan
Attorney, Agent, or Firm—Armstrong, Nikaido & Marmelstein

[57] ABSTRACT

For automatically terminating the operation of the vibrator in a self-propelled roller compactor when the vehicle is at rest or travelling slowly, a variable displacement pump driving the hydraulic motor of the vibrator is provided with a servo control mechanism including a spring-neutralized linear actuator capable of adjustably varying the per-cycle displacement of the pump by receiving hydraulic fluid pressure from another pump. Provided between the servo control mechanism and the said other pump is an on-off valve which is closed when the vehicle speed becomes less than a predetermined value, with the result that the actuator is neutralized to zero the displacement of the variable displacement pump. The on-off valve can be operated from an operator controlled shift lever, so as to be closed when the lever is in or adjacent a neutral position.

4 Claims, 3 Drawing Figures

CONTROL SYSTEM FOR A HYDRAULICALLY ACTUATED DEVICE SUCH AS THE VIBRATOR MOTOR OF A SELF-PROPELLED VIBRATORY COMPACTOR

BACKGROUND OF THE INVENTION

This invention relates to a system for controlling the operation of a hydraulically actuated device such as a hydraulic motor. The control system according to the invention has particular utility in conjunction with the hydraulic drive motor of the vibrator in a self-propelled vibratory compactor of the roll type, but with no unnecessary limitations thereto being intended.

As is well known, vibratory roller compactors combine static weight with vibratory forces for dynamic compaction of soils, asphalt or the like. Such compactors have the problem that if the vibrator mounted within their roll is held in motion while the vehicle is at rest, a depression is formed in the soil or asphalt surface just under the roll. Hence, as the compactor travels back and forth over a limited area of desired soil or the like to be compacted, for example, depressions are formed at the opposite ends of the area where the vehicle temporarily stops for a change of direction.

In order to overcome this problem, it has been suggested to provide a selector valve for the on-off control of communication between the hydraulic drive motor of the vibrator and a fixed displacement pump supplying pressurized fluid thereto. The selector valve is adapted to be closed automatically to block communication between pump and motor when the vehicle is at rest or travelling very slowly.

This prior art control system has the disadvantage, however, that the selector valve in use must be a high pressure, large capacity valve since it is required to open and close the main supply circuit connecting the fixed displacement pump to the vibrator motor. Moreover, the main supply circuit suffers considerable shock each time the valve is opened or closed, and there is a substantial amount of energy wasted particularly when the vibrator is set out of operation.

SUMMARY OF THE INVENTION

It is the principal object of this invention to provide an improved system for controlling the supply of pressurized hydraulic fluid to a hydraulically actuated device.

Another object of the invention is to provide a control system of the character described which is particularly well applicable to a vibratory compactor of the roll type, for automatically terminating the operation of the vibrator when the vehicle is at rest or travelling slowly.

A further object of the invention is to provide a control system which when applied to a vibratory compactor, for example, makes it possible to adjustably vary the rotative speed of the vibrator motor and, therefore, the vibratory force developed by the vibrator.

A further object of the invention is to provide a control system which necessitates the use of no high pressure, large capacity valve.

A still further object of the invention is to provide a control system which gives rise to no shock in the hydraulic circuit and which minimizes the waste of energy.

According to the broadest aspect of this invention, there is provided a control system comprising first pump means, second pump means of the variable displacement type for supplying pressurized hydraulic fluid to a desired hydraulically actuated device, servo control means receiving pressurized hydraulic fluid from the first pump means and adapted to adjustably vary the displacement per cycle of the second pump means, selector valve means for the on-off control of communication between the first pump means and the servo control means, and means for operating the selector valve means. The servo control means include an actuator which is adapted to be neutralized in the absence of the pressurized fluid from the first pump means to the servo control means, with the result that the second pump means is conditioned for zero displacement.

In some preferred embodiments of this invention hereinafter presented, in which the control system is adapted for the hydraulic vibrator motor of a self-propelled vibratory compactor, the selector valve is adapted to be operated from an operator controlled shift lever associated with the vehicle transmission, in such a manner that the valve is closed when the shift lever is in or adjacent its neutral position. It should be appreciated that this selector valve is intended merely to open and close the fluid path between first pump means and servo control means, so that no high pressure, large capacity valve is required.

The above and various other objects, features and advantages of this invention and the manner of attaining them will become more apparent, and the invention itself will best be understood, upon consideration of the following description taken in connection with the accompanying drawings showing the preferred embodiments of the invention.

DESCRIPTION OF THE PREFERRED EMBODIMENTS

Figure 1:
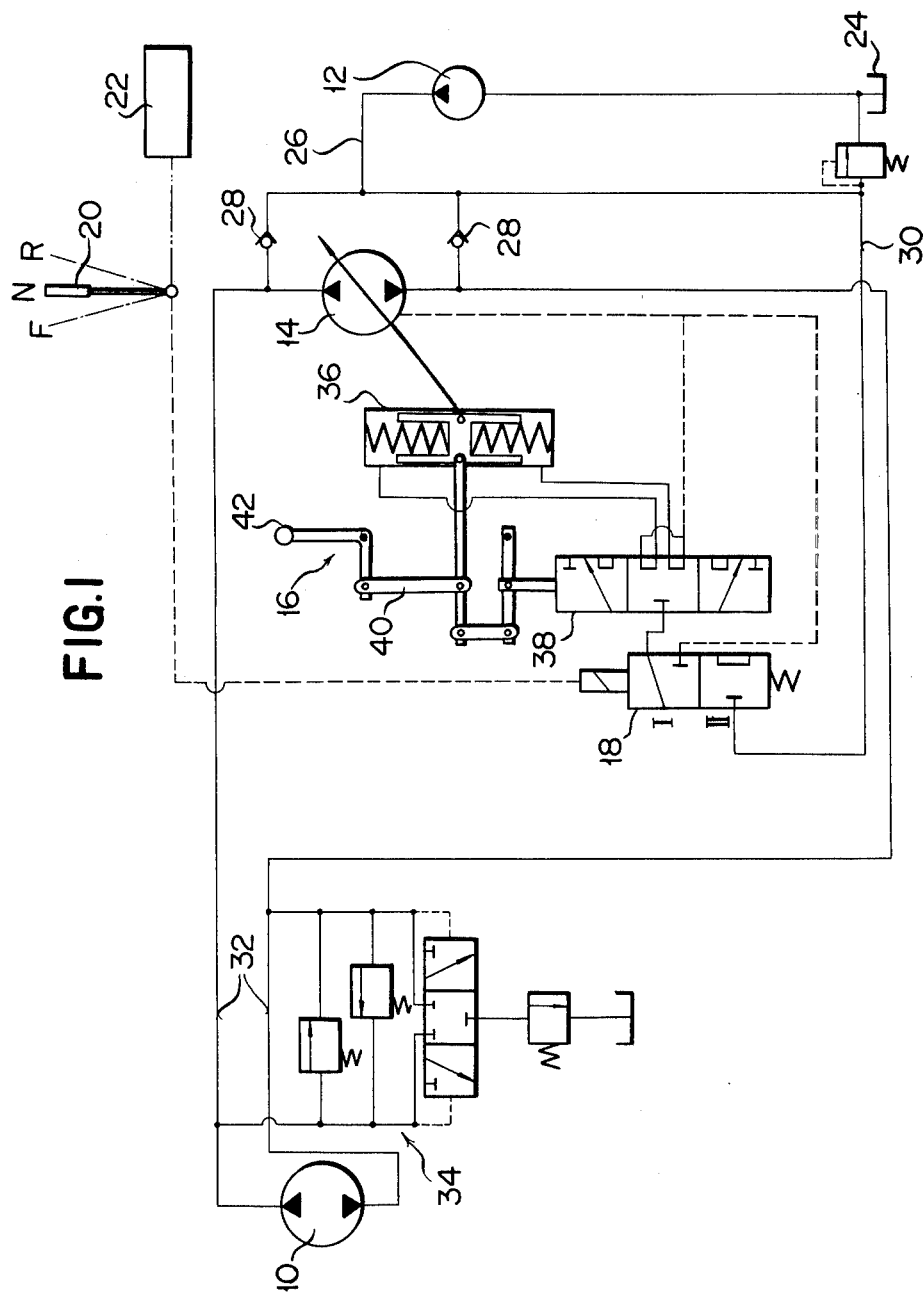
FIG. 1 is a diagrammatic representation of the control system according to this invention as adapted specifically for the hydraulic drive motor of a vibrator in a self-propelled vibratory compactor.

The hydraulic control system according to this invention is illustrated in its first preferred form in FIG. 1 as adapted for a hydraulic motor, shown at 10, used as a drive source of a vibrator mounted within the roll of a self-propelled vibratory compactor. The control system broadly comprises a first or charging pump 12, a second or variable displacement pump 14 receiving pressurized hydraulic fluid from the charging pump and supplying in a controlled manner pressurized hydraulic fluid to the vibrator motor 10 which is of the fixed displacement type, a servo control mechanism 16 for adjustably varying the per-cycle displacement of the variable displacement pump, a selector valve 18 for the on-off control of communication between the charging pump and the servo control mechanism, and an operator controlled shift lever 20 conventionally associated with the transmission 22 of the vehicle power train and utilized for operating the selector valve.

Of the fixed displacement, unidirectional type, the charging pump 12 is driven from the vehicle engine to draw hydraulic fluid from a reservoir 24. Pressurized fluid from the output line 26 of the charging pump is delivered, on the one hand, to the variable displacement pump 14 via a pair of check valves 28 and, on the other hand, to the servo control mechanism 16 via a line 30 and the selector valve 18.

Both variable displacement pump 14 and vibrator motor 10 are shown to be of the bidirectional type, and the pair of outlets of the pump are connected to the pair of inlets of the motor via a pair of main supply lines 32, respectively, thereby forming a closed hydraulic circuit. Preferably, a system 34 of relief valves and a shuttle valve should be connected across the main supply lines 32 as shown.

For adjustably varying the per-cycle displacement of the variable displacement pump 14, there is provided the servo control mechanism 16 comprising a double-acting linear actuator 36 having a spring neutralized piston which is mechanically connected to the variable displacement pump, a three-position servo valve 38 for controlling the supply of pressurized fluid to the pair of opposed fluid chambers of the actuator, and a linkage system 40 through which the servo valve is operated by a motor speed control lever 42 as well as by the piston of the actuator.

In practice the variable displacement pump 14 may be a piston pump of the swash plate type, the per-cycle displacement of which is adapted to be adjustably varied, as has been known heretofore, as dictated by the position of the piston of the actuator 36, which in turn is varied by the motor speed control lever 42 via the linkage system 40 and servo valve 38. The variable displacement pump 14 is conditioned for zero displacement when the piston of the actuator 36 is neutralized as shown.

Upon actuation of the motor speed control lever 42, the servo valve 38 is displaced via the linkage system 40 to either of its offset positions so that, if the selector valve 18 is then open, pressurized fluid from the charging pump 12 is supplied to one of the fluid chambers of the actuator 36 thereby causing its piston to travel in either direction from its neutral position against the force of one of the neutralizing springs. The variable displacement pump 14 thus starts supplying pressurized fluid to the vibrator motor 10 at the desired rate.

With the displacement of the actuator piston from its neutral position, the linkage system 40 is thereby actuated to return the servo valve 38 to its closed center position. The servo valve is therefore held closed during the rotation of the vibrator motor 10. In this closed position of the servo valve, the pair of its outlet ports communicating with the respective fluid chambers of the actuator 36 are slightly open to the drain ports to permit a limited rate of fluid flow back from the actuator. As long as the selector valve 18 is open, however, the neutralization of the actuator is prevented by the cooperation of the servo valve 38 and linkage system 40.

In this particular embodiment of the invention, the selector valve 18 is shown as a solenoid operated valve, having a solenoid electrically connected to limit switch means, not shown, actuated by the shift lever 20. The selector valve 18 has a first or open position I for placing the charging pump 12 in communication with the servo control mechanism 16 and a second or closed position II for blocking communication therebetween.

The shift lever 20 associated with the vehicle transmission 22 has a centrally disposed neutral position N and forward and reverse positions F and R disposed on the opposite sides thereof. Actuated by the vehicle operator, the shift lever 20 conditions the transmission for forward drive when turned to its forward position F and for reverse drive when turned to its reverse position R. The solenoid operated selector valve 18 is related to the shift lever 20 so that the valve may be in its open position I when the lever is either in its forward position F or reverse position R, and in its closed position II when the lever is in or adjacent its neutral position N.

In operation, during the dynamic compacting operation of the vibratory compactor, with the vehicle travelling in either the forward or reverse direction, the variable displacement pump 14 supplies pressurized hydraulic fluid to the vibrator motor 10 at a rate determined by the position of the motor speed control lever 42. The vibrator motor 10 is therefore rotated at the desired speed to cause the vibrator to generate mechanical vibrations which are imparted to the roll of the compactor. The selector valve 18 is of course in its open position I during such compacting operation of the vehicle.

If now the shift lever 20 is turned from its forward or reverse position to the neutral position N for reversing the travelling direction of the vehicle, it will stop travelling, and the solenoid operated selector valve 18 will shift from its open position I to its closed position II when the shift lever reaches or approaches the neutral position. With the servo control mechanism 16 thus blocked from communication with the charging pump 12, its servo valve 38 and linkage system 40 becomes unable to prevent the piston of the actuator 36 from returning to its neutral position under the bias of one of the neutralizing springs.

Upon neutralization of the actuator 36, the variable displacement pump 14 terminates the supply of pressurized fluid to the vibrator motor 10. The vibrator is therefore automatically set out of operation when the vehicle stops travelling or when the vehicle speed becomes sufficiently low, so that there is no possibility of allowing the roll to form a depression in the surface of soil or the like being compacted.

As the shift lever 20 is subsequently turned from its neutral to reverse or forward position for causing the compactor to travel in the opposite direction, the solenoid operated selector valve 18 shifts from its closed position II back to the open position I thereby placing the servo control mechanism 16 in communication with the charging pump 12 by way of the line 30. Thereupon pressurized fluid is supplied via the servo valve 38 to one of the opposed fluid chambers of the actuator 36, so that its piston travels back to the same position as before the change of travelling direction, which position has been determined as aforesaid by the position of the motor speed control lever 42. Since then the vibrator motor 10 can be driven by the variable displacement pump 14 at the same speed as before, the dynamic compacting operation is resumed automatically as the vehicle starts travelling in the opposite direction.

Figure 2:
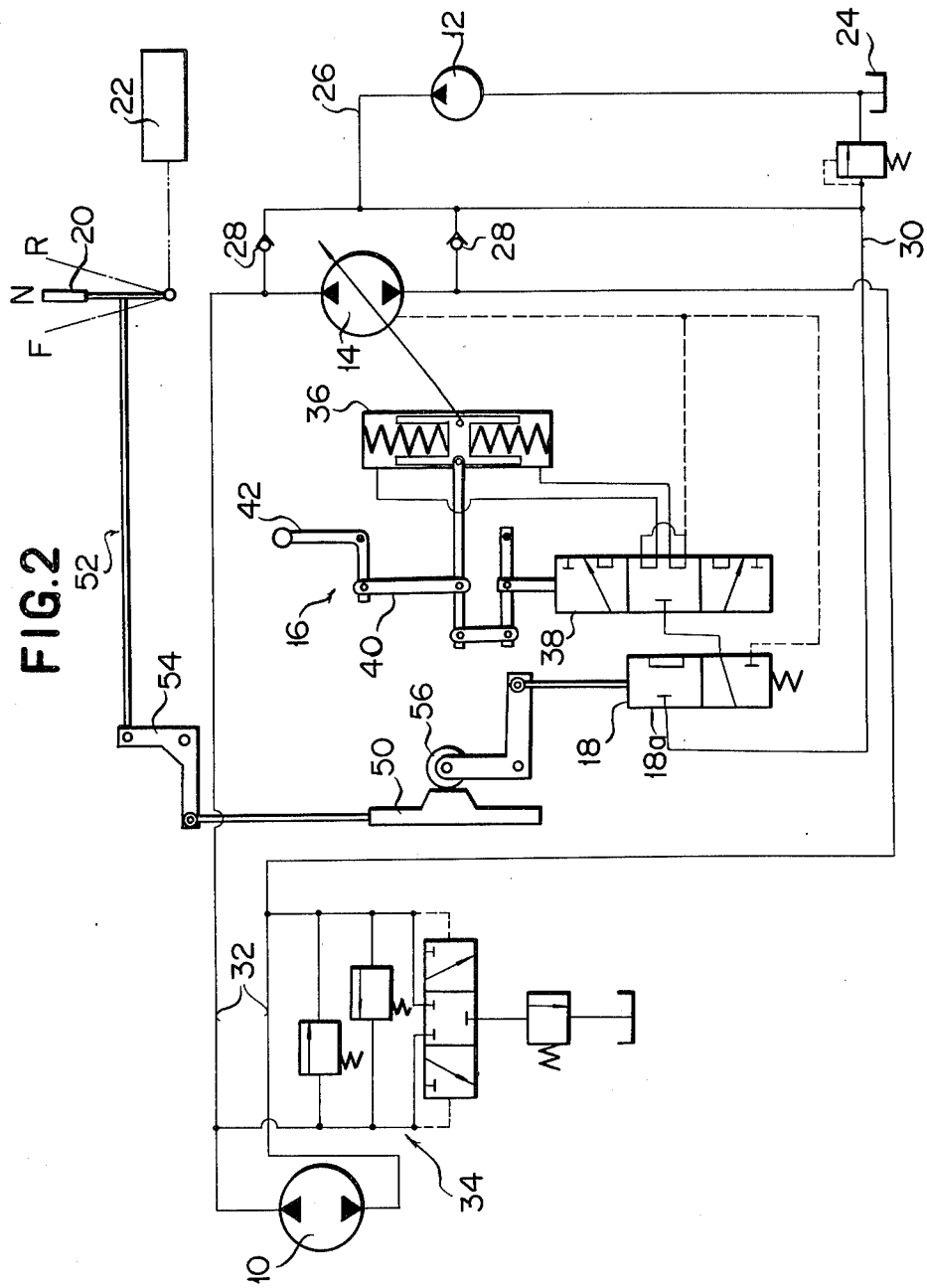
FIG. 2 is a similar representation of another preferred embodiment of the invention.

FIG. 2 illustrates another preferred embodiment of the invention, including different means for operating a selector valve 18a which itself functions in exactly the same manner as the solenoid operated selector valve 18 of the preceding embodiment. The selector valve 18a is operated by a cam mechanism comprising a reciprocally movable cam member 50 connected to the operator controlled shift lever 20 via a linkage system 52 including a bell crank 54, and a roller cam follower 56 operatively connected to the selector valve for communicating the motion of the cam member thereto.

Normally, that is, when the shift lever 20 is in or adjacent its neutral position N, the roller cam follower 56 rides over the boss of the cam member 50, with the result that the selector valve 18a is held closed to block communication between the charging pump 12 and servo control mechanism 16. As the shift lever 20 is turned to either of its forward and reverse positions F and R, the roller cam follower 56 rides off the boss of the cam member 50 thereby causing the selector valve 18a to place the servo control mechanism 16 in communication with the charging pump 12.

The other parts of the hydraulic circuit are identified by the same reference numerals as those used to identify the corresponding parts of the preceding embodiment, and their description will be omitted. The other details of operation are also believed to be apparent from the foregoing description of FIG. 1.

Figure 3:
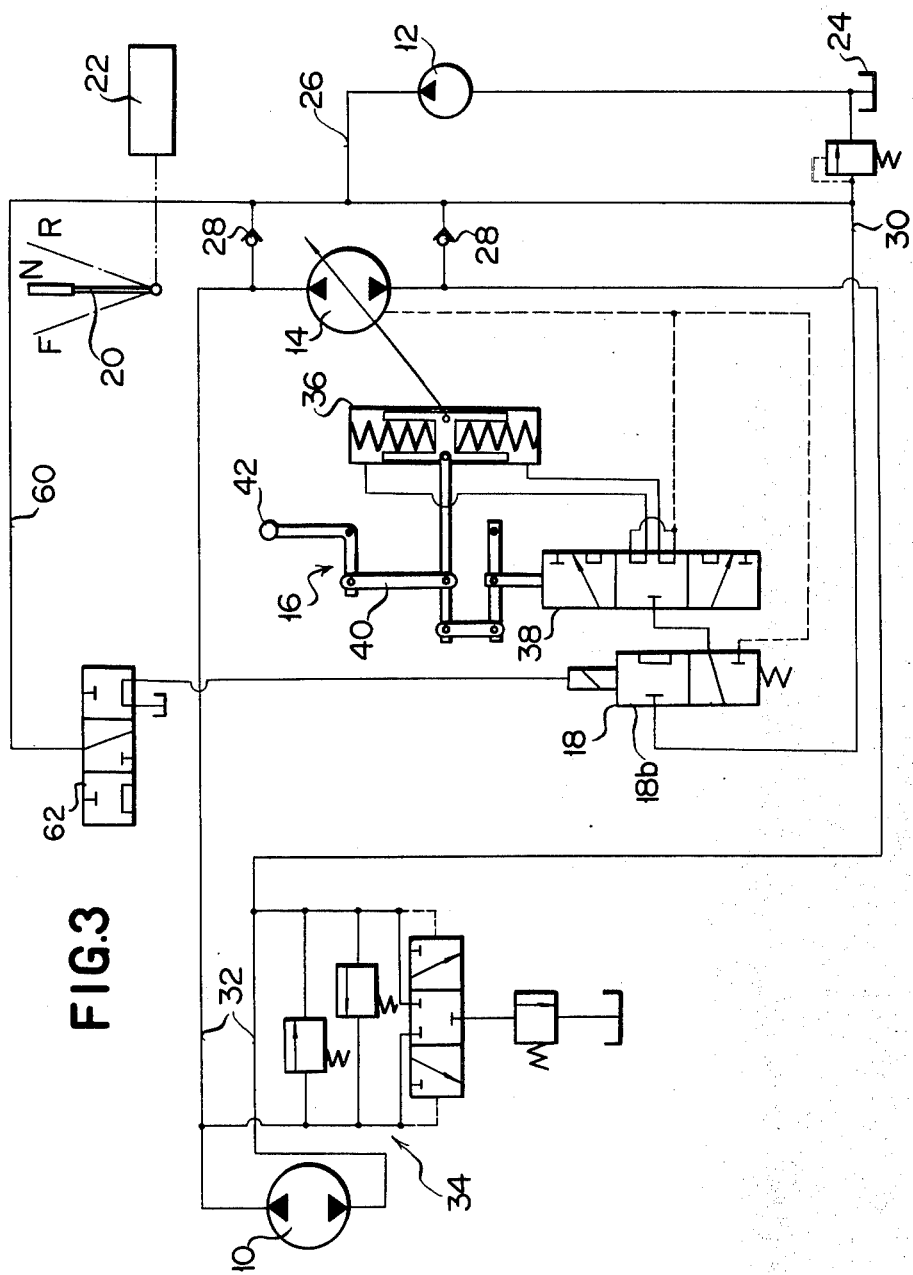
FIG. 3 is also a similar representation of still another preferred embodiment of the invention.

In still another preferred embodiment of the invention shown in FIG. 3, a selector valve 18b is adapted to be operated by hydraulic pilot pressure supplied from the charging pump 12 through a line 60 having a three-position pilot valve 62. Mechanically linked to the operator controlled shift lever 20 so as to be operated thereby, the pilot valve 62 has an open center position and a pair of closed offset positions disposed on the opposite sides thereof.

Thus, when the shift lever 20 is located in or adjacent the neutral position N, the pilot valve 62 is open to permit the supply of pilot pressure from the charging pump 12 to the selector valve 18b, with the result that the servo control mechanism 16 is thereby blocked from communication with the charging pump 12. As the shift lever 20 is turned to its forward position F or reverse position R, the pilot valve 62 is displaced to the corresponding closed offset position to terminate the supply of pilot pressure to the selector valve 18b. Thereupon the selector valve 18b is spring actuated to its open position to place the servo control mechanism 16 in communication with the charging pump 12. The other details of construction and operation are set forth above in connection with FIG. 1.

Although the present invention has been shown and described in terms of specific embodiments thereof, it is understood that the invention is not to be restricted by the exact details of this disclosure. For example, instead of operating the selector valve from the shift lever as in the illustrated embodiments, there may be provided a vehicle speed sensing mechanism which is associated with the selector valve so that the latter may be closed when the vehicle speed becomes less than a predetermined value. Furthermore, while the invention has been disclosed with reference to a self-propelled vibratory compactor, it will be apparent that it can be utilized for other applications. The invention, therefore, should be accorded the full scope of the following claims.

What is claimed is:

1. In a vibratory compactor having a vibrator driven by a hydraulic motor, a control system comprising in combination:
   first pump means;
   second pump means of the variable displacement type for supplying pressurized hydraulic fluid to said motor;
   servo control means receiving pressurized hydraulic fluid from said first pump means and adapted to adjustably vary the per-cycle displacement of said second pump means, said servo control means including an actuator which is adapted to be neutralized automatically upon termination of the supply of pressurizd hydraulic fluid from said first pump means to said servo control means, with the result that said second pump means is prevented from supplying pressurized hydraulic fluid to said motor;
   selector valve means for the on-off control of communication between said first pump means and said servo control means; and
   valve operating means for operating said selector valve means so as to block communication between said first pump means and said servo control means when the travelling speed of the vibratory compactor becomes less than a predetermined value;
   whereby said vibrator is automatically set out of operation when the travelling speed of the vibratory compactor becomes less than the predetermined value.

2. The control system as recited in claim 1, wherein said selector valve means is a solenoid operated valve, and wherein said valve operating means includes an operator controlled shift lever, said solenoid operated valve being adapted to be electrically operated by said shift lever so as to block communication between said first pump means and said servo control means when said shift lever is in or adjacent a predetermined neutral position.

3. The control system as recited in claim 1, wherein said valve operating means comprises an operator controlled shift lever, cam means operatively connected to said shift lever, and cam follower means operatively connected to said selector valve means, said cam follower means being adapted to be actuated by said cam means so as to cause said selector valve means to block communication between said first pump means and said servo control means when said shift lever is in or adjacent a predetermined neutral position.

4. The control system as recited in claim 1, wherein said selector valve means is a pilot operated valve, and wherein said valve operating means comprises an operator controlled shift lever, and a pilot valve connected in a path of pilot pressure from said first pump means to said pilot operated selector valve, said pilot valve being adapted to be operated from said shift lever so as to cause said pilot operated selector valve to block communication between said first pump means and said servo control means when said shift lever is in or adjacent a predetermined neutral position.

* * * * *